United States Patent Office 3,284,389
Patented Nov. 8, 1966

3,284,389
PLASTICIZED POLYMERIC COATING COMPOSITION AND COATED ARTICLES
William Paul Kane, Bon Air, Va., assignor to E. I. du Pont de Nemours and Company, Wilmington, Del., a corporation of Delaware
No Drawing. Filed July 16, 1964, Ser. No. 383,228
17 Claims. (Cl. 260—27)

This invention relates to coating of webs of hydrophilic organic polymeric materials such as regenerated cellulose film. More particularly, this invention is directed to coating compositions based on homopolymers of vinyl chloride and to coated articles utilizing such compositions.

The homopolymers and copolymers of vinyl chloride are both well known materials. Although vinyl chloride homopolymers have found wide application in molded, extruded, and calendered forms and shapes, in the field of coatings the copolymers have been employed in the past because of their greater range of properties which allows a choice of the material having the best balance of properties for a specific application. In general, vinyl chloride homopolymers have not found wide utility as surfacing materials, especially in the case of hydrophilic substrates such as regenerated cellulose film.

It seems at first somewhat surprising that vinyl chloride homopolymers have not been found useful in coating regenerated cellulose film, especially in view of the price of homopolymers as compared to those of the copolymers, the latter generally being at least 50 to 200% more expensive than the former. The reason for this situation is that vinyl chloride homopolymer does not adhere adequately when used as the film former of a coating for cellophane, particularly under wet-out conditions, even if typical cellophane anchoring resins are employed.

Vinyl chloride homopolymers are inexpensive polymers especially when compared to other film forming resins suitable for use on regenerated cellulose film such as nitrocellulose and vinylidene chloride copolymers. On the other hand, vinyl chloride copolymers, even those with only minor amounts of comonomer are not inexpensive and generally more closely approach the cost of the other film formers named hereinabove than they do vinyl chloride homopolymers. The higher cost of vinyl chloride copolymers as compared to the cost of homopolymer is only in part attributable to the comonomer present, the remainder of the increase being due to the inherently greater complexity of the polymerization process necessary for production of the copolymer. It has long been a goal of manufacturers of regenerated cellulose films to perfect for such film a coating composition based on vinyl chloride homopolymer.

Accordingly, the primary object of this invention is a useful coating composition for hydrophilic organic polymeric materials such as regenerated cellulose film based on vinyl chloride homopolymer. A more specific object is the development of a coating composition for regenerated cellulose film which employs inexpensive vinyl chloride homoploymer as the film former and which possesses good wet anchorage properties.

In accordance with this invention, a novel coating composition is provided which comprises from about 50 to 100 parts by weight of vinyl chloride homopolymer; from about 10 to 50 parts by weight of a vinylidene chloride copolymer defined hereinafter; from about 10 to 30 parts by weight of a first plasticizer having a melting point below about 40° C., from about 5 to 15 parts by weight of a second plasticizer having a melting point above about 40° C., said first and said second plasticizers being selected from the group consisting of diesters of phthalic acid, triesters of phosphoric acid, triesters of citric acid, triesters of 2-acyl citric acid, and mixed diesters and triesters thereof; from about 0.5 to 10 parts by weight of a wax; and from about 0.1 to 1.0 part by weight of a particulate antiblocking agent.

The vinyl chloride homopolymer of this coating composition preferably has a specific viscosity of about 0.2 to 0.6 when measured at 30° C. at a concentration of 0.4% by weight in solution in nitrobenzene, although polymers of higher viscosity may be used if desired.

The copolymer of vinylidene chloride comprises essentially those polymers obtained by polymerizing a mixture of 35 to 96.5% by weight vinylidene chloride, 0.5 to 25% by weight of an acidic ethylenic compound and from about 3 to 40% by weight of at least one other polymerizable monoolefinic monomer. The acidic ethylenic compound preferably is itaconic acid, acrylic acid, methacrylic acid, citraconic acid, mesaconic acid, aconitic acid and the corresponding anhydrides and mixed anhydrides derived therefrom. Other polymerizable acidic ethylenic compounds can also be used. The other polymerizable monoolefinic monomer is preferably of the group consisting of acrylonitrile, alkyl esters of acrylic and methacrylic acids having from 1 to 18 carbon atoms in the alkyl group, phenyl methacrylate, cyclohexyl methacrylate, p-cyclohexylphenyl methacrylate, methacrylonitrile, methyl vinyl ketone, vinyl acetate and vinyl chloride.

As mentioned above, the first and second plasticizer can be a phthalate diester, phosphate triester, citrate triester or 2-acyl citrate triester. The ester groups of each such compound can be the same or different and generally will be alkyl, cycloalkyl or aryl of up through 12 carbon atoms. When the group is cycloalky, the ring will ordinarily contain 5 or 6 carbons and the ring can be substituted with a phenyl group or one or more alkyl groups. When the group is aryl, such groups are included as phenyl, naphthyl, alkaryl and aralkyl. The acyl group in the 2-acyl citrate triester will ordinarily be devoid of carbon-to-carbon unsaturation and have 2 through 4 carbon atoms.

The first plasticizer is a liquid at room temperature or has a melting point only slightly above room temperature. Examples include dibutyl phthalate, di(methylcyclohexyl) phthalate, butyl benzyl phthalate, diphenyl 2-ethylhexyl phosphate, triethyl citrate, tributyl citrate, acetyl tributyl citrate, and acetyl trioctyl citrate. Dibutyl phthalate is a highly preferred first plasticizer.

The second plasticizer is a solid at room temperature or at temperatures slightly above room temperature. Examples include dicyclohexyl phthalate, tricyclohexyl phosphate, triphenyl phosphate, and tricyclohexyl citrate.

The wax can be any natural or synthetic wax material, of plant or animal origin. The term is used in its ordinary accepted sense well understood by persons skilled in the art. A large number of representative waxes are disclosed, for example, in the Handbook of Chemistry and Physics, thirty-seventh edition, published by Chemical Rubber Publishing Co., at pages 1392–1403.

When the coating composition is to have a low permeability to water vapor, the wax employed will be a moistureproofing wax. Preferably this wax is a paraffin wax having a melting point within the range of about 125° to 170° F. In such a case, there will also be included from about 0.1 to 10 parts by weight of a blending resin. When the wax is a moistureproofing wax, the composition is identified as a moistureproof coating composition. Optionally, when the waxy material is not a moistureproofing wax, the blending resin may be omitted from the formulation, in which case a "semi-moistureproof" coating is obtained. By "semi-moistureproof" coating is meant a coating which provides a film having a moisture permeability value greater than that of a moistureproof film but less than that of an uncoated sheet of base film.

Although the preferred wax is a paraffin wax, any of the suitable waxes listed for example in the aforementioned handbook can be used, including but not limited to natural and synthetic materials such as beeswax, palm wax, carnauba wax, ozecerite, pentaerythritol tetrastearate, aliphatic ketones generally where each group attached to the carbonyl group is a primary alkyl radical of 8–33 carbons, erucamide, synthetic amides generally known to be waxes such as saturated and olefinically unsaturated amides of monocarboxy acids of 16–26 or so carbons, e.g., stearamide, and the like.

When used, the blending resin also will be of the class well recognized in the art. The term is well understood as meaningful and is used in its accepted sense. Representative of such resins, but not limitative, are maleic anhydride treated rosin esters such as the glyceryl ester of maleic anhydride treated rosin. Other useful blending agents include, for example, ester gum, rosinates, hydrogenated rosin and esters thereof, damar, copal, kauri, alkyd resins, and the like.

When the wax used is a moistureproofing wax, it is preferred that the vinylidene chloride copolymer contain about 80 to 96.5% by weight vinylidene chloride. This is because of the inherent moistureproofness of polymers in that composition range, thus permitting the use of smaller quantities of moistureproofing wax to achieve the degree of moistureproofness desired. In such case the amount of acidic ethylenic compound will be 0.5–5% and the other monomer 3–19.5% by weight.

The coating composition also includes a particulate material which serves as an antiblocking agent. Any inert substance insoluble in the solvent employed for the coating operation may be used, such as aluminum silicate clay, calcium silicate, mica, polystyrene, etc., as long as the particles are sufficiently small, i.e. of customary size which may vary in the usual manner from colloidal or below up to an average diameter as much as the coating thickness of the coating or greater.

The coating composition of this invention can be applied onto the base sheet in any known type of coating apparatus capable of handling lacquers dissolved in organic solvents. The coating can be metered in known ways by use of such apparatus as doctor rolls, doctor knives, gravure rolls, and the like.

The coating is generally applied in an amount between about 2 and 10 grams per square meter of film, distributed approximately equally on the two sides of the film. In the interest of economy, it is preferred to limit the coating weight to less than about 6 grams per square meter. It is also possible to apply the coating to just one side of the film in which event the coating thickness will ordinarily be of a coating weight within the range of about 1 to 6 grams per square meter.

The coating is conveniently prepared as a lacquer containing between about 5 and 25% solids. Solvents which can be used include benzene, toluene, xylene, tetrahydrofuran, ketones such as acetone and methyl ethyl ketone, and the like. Although a single solvent can be used, mixtures of two such solvents can be employed, and frequently the properties of the coatings are improved by so doing.

This invention has been described primarily in terms of coating a regenerated cellulose base sheet but it is to be understood that the invention is applicable to hydrophilic organic polymeric materials generally and to other shaped articles of such materials. Thus, the invention is applicable to tubes, filaments, etc., as well as sheets, pellicles, webs and films. The articles can be composed of cellulosic materials such as regenerated cellulose prepared from solutions of cellulose xanthate such as sodium cellulose xanthate (viscose), from cuprammonium cellulose, and from solutions in organic salts such as calcium thiocyanate. The articles can also be composed of a cellulose ester or ether such as cellulose acetate, cellulose nitrate, ethyl cellulose, methylcellulose, hydroxyethyl cellulose, hydroxypropyl cellulose, paper, etc., which materials contain free hydroxyl groups and are hydrophilic in character. Certain noncellulosic materials such as polyvinyl alcohol and partially hydrolyzed ethylene-vinyl acetate copolymers also come within the scope of hydrophilic organic polymeric materials.

The films of this invention possess properties which make them admirably suitable as packaging films. These films are useful for wrapping various items including sponges, hosiery, packages of tobacco products, and food items such as candy, fresh produce, baked goods, and so forth. The properties of the films described herein were assessed by the tests described in the following paragraphs.

IPV or initial permeability value is a measure of the moistureproofness of the coated film. The definition of and test for moistureproofness are set forth in Ubben U.S. Patent No. 2,147,180 issued February 14, 1939. In general a coated film having an IPV of 100 grams of water/100 square meters/hour, or less, at 39.5° C. is considered to have satisfactory moisture proofness.

Heat seal strength is measured by cutting a piece of the coated film 4 inches by 10 inches with the grain or machine direction of the film running in the long dimension of the sample into 2 pieces 4 inches by 5 inches each. The 2 pieces are superimposed so that opposite surfaces are in contact and are then sealed together at each end at right angles to the grain by applying a ¾ inch wide sealing bar under carefully controlled conditions of temperature (140° C.), pressure (5 p.s.i.), and contact time (¼ second). The sealed sheets are then cut in half at right angles to the grain. From the center of each of the two resulting pieces, two 1½ inch wide strips parallel to the grain are cut. The resulting 4 sets of strips are tested by opening each set at the free end, placing them in a Suter testing machine, and pulling them apart. The highest force in grams required to pull the strips apart is taken as a measure of the heat seal bond strength. Heat seals are measured after conditioning the film for three days at a specific relative humidity, usually 35% or 81% R.H., the latter being a more severe test of the quality of the film coating.

Anchorage refers to the adhesion of the coating to the base film when in direct contact with water. Samples of coated film are suspended in water at 45° C. for 24 hours and then graded as follows:

Grade 1 _____ No blisters.
Grade 2 _____ Few blisters.
Grade 3 _____ Decided blistering.
Grade 4 _____ Coating sloughs off at blistered or unblistered portions.

Blocking is determined by preparing a stack of 30 to 32 sheets of film, 3½ inches by 4 inches, piled front to back throughout the stack. The stack is placed between two 3½ inch by 4 inch sheets of chipboard and wrapped in waxed kraft paper. The package is placed on a smooth sheet of metal at least 1/16 inch thick and approximately 6 inches square. A 3½ inch by 4 inch lead weight with a smooth face and having a weight of 4.6 pounds (⅓ pound per square inch) is accurately placed on the package of sheets, and the entire assembly is placed in an oven maintained at 45° C. for 24 hours, though no appreciable difference in blocking result from retaining them in the oven for considerably longer periods such as 3 or more days. The packages of sheets are removed from the oven and allowed to cool to room temperature (one hour or more) after which they are graded. The package of sheets is carefully unwrapped, the chipboard removed and the stack of sheets is grasped by thumb and forefinger in the center of the stack. A shearing force is then applied with care taken to avoid bending the stack or disturbing its edges. The stack is graded as follows:

Grade 1—the sheets slide apart individually with no tendency whatever to cling together.
Grade 1+—the sheets slide apart individually but with perceptible cling.
Grade 2—the stack separates into 2 or more groups of sheets which remain moderately firmly matted together.
Grade 2+—the stack separates on application of the maximum force into 2 or more groups of sheets which are firmly matted together.
Grade 3—the stack cannot be separated by straight force.

Note.—Easy separation of the top and bottom sheets in grades 2, 2+, and 3 should be disregarded. In grades 2, 2+ and 3 the film is said to have "blocked" with varying degrees or severity.

The following examples will serve to illustrate some possible embodiments of the invention, but are not intended to serve as limitations thereon. Parts are by weight unless otherwise specified.

EXAMPLE 1

A coating lacquer was prepared at 15% solids from the following ingredients:

| | Parts |
|---|---|
| Vinyl chloride homopolymer | 75 |
| Polymer prepared from 90.5 parts vinylidene chloride, 9 parts acrylonitrile and 0.5 part itaconic acid | 25 |
| Dibutyl phthalate | 20 |
| Dicyclohexyl phthalate | 10 |
| Paraffin wax, melting point 143° F. | 3 |
| Maleic anhydride treated rosin glyceryl ester | 5 |
| Pulverized aluminum silicate clay | 0.4 |
| Tetrahydrofuran | 391.5 |
| Toluene | 391.5 |

The lacquer was coated onto softened regenerated cellulose film containing 0.30% melamine-formaldehyde anchorage resin. The film so prepared possessed the following properties:

| | |
|---|---|
| Appearance | good |
| Anchorage | grade 1 |
| Blocking | grade 1 |
| IPV | 42 |
| Heat seal (35% R.H.) | 377 |
| Heat seal (81% R.H.) | 275 |

In order to assess the relative greaseproofness of the film of this example and nitrocellulose coated film which had an IPV of 48, samples of the two films were used to wrap slices of pound cake. The wrapped slices were stored at about 25° C. for 21 days, the films were removed from the packages and the moisture permeabilities measured. After being used, the film of this example had a permeability of 850 as compared to 1500 for the nitrocellulose coated film.

EXAMPLES 2–4

Example 1 was repeated except that the 10 parts of dicyclohexyl phthalate was replaced in turn by 10 parts of tricyclohexyl citrate, tricyclohexyl phosphate, and triphenyl phosphate respectively. The properties of the films were substantially the same as those in Example 1.

EXAMPLE 5

A coating lacquer was prepared at 10% solids with the following ingredients:

| | Parts |
|---|---|
| Vinyl chloride homopolymer | 60 |
| Polymer prepared from 85 parts vinylidene chloride, 14 parts methyl acrylate and 1 part itaconic acid | 40 |
| Dibutyl phthalate | 20 |
| Dicyclohexyl phthalate | 10 |
| Carnauba wax | 1.2 |
| Pulverized mica | 0.3 |
| Methyl ethyl ketone | 1183.5 |

The lacquer was coated onto softened regenerated cellulose film containing 0.38% urea-formaldehyde anchorage resin. The film so prepared had the following properties:

| | |
|---|---|
| Appearance | good |
| Anchorage | grade 1 |
| Blocking | grade 1 |
| IPV | 1550 |
| Heat seal (35% R.H.) | 500 |
| Heat seal (81% R.H.) | 360 |

EXAMPLE 6

The coating formulation of Example 1 was altered to incorporate no vinylidene chloride copolymer and 100 no vinylidene chloride copolymer. When coated onto the regenerated cellulose base sheet of Example 1, the resulting film exhibited grade 4 anchorage.

EXAMPLE 7

The coating formulation of Example 1 was altered to incorporate no vinylidene chloride copolymer and 100 parts of Geon 443, a vinyl chloride copolymer described as having good adhesion compared to other vinyl chloride polymers and copolymers. When coated onto the regenerated cellulose base sheet of Example 1, the resulting film exhibited grade 4 anchorage.

EXAMPLE 8

The coating formulation of Example 1 was altered to incorporate 90 parts of the vinyl chloride homopolymer and 10 parts of the vinylidene chloride copolymer, and it was coated on the same base sheet. The film properties were:

| | |
|---|---|
| Appearance | good |
| Anchorage | grade 1 |
| Blocking | grade 1 |
| IPV | 61 |
| Heat seal (35% R.H.) | 321 |

EXAMPLE 9

The coating formulation of Example 1 was altered to use 25 parts of a different vinylidene chloride copolymer, this one prepared from 89 parts vinylidene chloride, 6 parts methyl methacrylate, 4.5 parts acrylonitrile, and 0.5 part itaconic acid. This formulation was coated onto the same base sheet of Example 1 and gave film having the following properties:

| | |
|---|---|
| Appearance | good |
| Anchorage | grade 2 |
| Blocking | grade 1 |
| IPV | 5 |
| Heat seal (35% R.H.) | 356 |
| Heat seal (81% R.H.) | 285 |

EXAMPLE 10

The coating formulation of Example 1 was altered to use in place of the vinylidene chloride copolymer 25 parts of an 86/13/1 vinyl chloride/vinyl acetate/maleic acid copolymer. The coating formulation was coated onto the regenerated cellulose base sheet of Example 1. The resulting film exhibited grade 4 anchorage.

EXAMPLE 11

A coating lacquer was prepared at 15% solids from the following ingredients:

| | Parts |
|---|---|
| Vinyl chloride homopolymer | 90 |
| Polymer prepared from 90.5 parts vinylidene chloride, 9 parts acrylonitrile and 0.5 part itaconic acid | 18 |
| Dibutyl phthalate | 24 |
| Dicyclohexyl phthalate | 12 |
| Paraffin wax, melting point 143° F. | 3 |
| Maleic anhydride treated rosin glyceryl ester | 5 |
| Pulverized aluminum silicate clay | 0.35 |
| Tetrahydrofuran | 561.3 |
| Toluene | 302.3 |

The lacquer was coated onto softened regenerated cellulose film containing 0.35% melamine-formaldehyde anchorage resin. The film so prepared possessed the following properties:

| | |
|---|---|
| Appearance | good |
| Anchorage | grade 2 |
| Blocking | grade 1 |
| IPV | 50 |
| Heat seal (35% R. H.) | 320 |

EXAMPLE 12

A coating lacquer was prepared at 15% solids from the following ingredients:

| | Parts |
|---|---|
| Vinyl chloride homopolymer | 75 |
| Polymer prepared from 89 parts vinylidene chloride, 6 parts methyl methacrylate, 4.5 parts acrylonitrile and 0.5 part itaconic acid | 25 |
| Dibutyl phthalate | 20 |
| Dicyclohexyl phthalate | 10 |
| Stearamide | 0.5 |
| Pulverized aluminum silicate clay | 0.4 |
| Tetrahydrofuran | 371 |
| Toluene | 371 |

The lacquer was coated onto one side of a softened regenerated cellulose film containing 0.22% melamine-formaldehyde anchorage resin. The film so prepared possessed the following properties:

| | |
|---|---|
| Appearance | good |
| Anchorage | grade 1 |
| Blocking | grade 1 |
| IPV | 2100 |
| Heat seal (35% R.H.) | 285 |
| Heat seal (81% R.H.) | 225 |

The film was useful for wrapping fresh red meat.

EXAMPLES 13–15

Example 1 is repeated except that the 20 parts of dibutyl phthalate is replaced in turn by 20 parts of butyl benzyl phthalate, diphenyl 2-ethylhexyl phosphate, and acetyl tributyl citrate, respectively, with satisfactory results.

It is apparent that an advantage of this invention lies in providing a unique coating composition suitable for regenerated cellulose and like films, which coating is based on vinyl chloride homopolymer, thereby offering significantly better economics over other known cellophane coatings including those based on vinyl chloride copolymers. Another advantage is in providing a coating which is inexpensive and which at the same time exhibits excellent anchorage characteristics. A further advantage is that the coating provides greaseproofness superior to nitrocellulose based coatings.

What is claimed is:

1. A coating composition comprising by weight about 50–100 parts vinyl chloride homopolymer;
10–50 parts copolymer of 35–96.5% by weight vinylidene chloride, 0.5–25% by weight of an acidic ethylenic compound and 3–40% by weight of at least one other polymerizable monoolefinic monomer;
10–30 parts of a first plasticizer having a melting point below about 40° C. and selected from the group consisting of dicyclohexyl phthalate, tricyclohexyl phosphate, triphenyl phosphate and tricyclohexyl citrate;
5–15 parts of a second plasticizer having a melting point above about 40° C., and selected from the group consisting of dibutyl phthalate, di(methylcyclohexyl) phthalate, butyl benzyl phthalate, diphenyl 2-ethylhexyl phosphate, triethyl citrate, tributyl citrate, acetyl tributyl citrate and acetyl trioctyl citrate;
0.5–10 parts wax; and
0.1–1 part particulate antiblocking agent.

2. A coating composition comprising by weight about 50–100 parts vinyl chloride homopolymer;
10–50 parts copolymer of 35–96.5% by weight vinylidene chloride, 0.5–25% by weight of an acidic ethylenic compound selected from the group consisting of itaconic acid, acrylic acid and methacrylic acid, and 3–40% by weight of a polymerizable monoolefinic monomer different from said acidic ethylenic compound and selected from the group consisting of acrylonitrile, alkyl esters of acrylic acid of 1–18 carbons in the alkyl group, alkyl esters of methacrylic acid of 1–18 carbons in the alkyl group, phenyl methacrylate, cyclohexyl methacrylate, p-cyclohexylphenyl methacrylate, methacrylonitrile, methyl vinyl ketone and vinyl chloride;
10–30 parts of a first plasticizer having a melting point below about 40° C. and selected from the group consisting of dicyclohexyl phthalate, tricyclohexyl phosphate, triphenyl phosphate and tricyclohexyl citrate;
5–15 parts of a second plasticizer having a melting point above about 40° C., and selected from the group consisting of dibutyl phthalate, di(methylcyclohexyl) phthalate, butyl benzyl phthalate, diphenyl 2-ethylhexyl phosphate, triethyl citrate, tributyl citrate, acetyl tributyl citrate and acetyl trioctyl citrate;
0.5–10 parts wax; and
0.1–1 part particulate antiblocking agent.

3. A composition as set forth in claim 1 wherein said vinyl chloride homopolymer has a specific viscosity of about 0.2–0.6 when measured at 30° C. at a concetration of 0.4% by weight in solution in nitrobenzene.

4. A composition as set forth in claim 1 wherein said wax is a moistureproofing wax and said composition additionally contains about 0.1–10 parts by weight of a blending resin.

5. A composition as set forth in claim 4 wherein said copolymer constitutes about 80–96.5% by weight of vinylidene chloride.

6. A composition as set forth in claim 4 wherein said wax is a paraffin wax having a melting point within the range of about 125° to 170° F.

7. A coating composition comprising by weight about 50–100 parts vinyl chloride homopolymer;
10–50 parts copolymer of 80–96.5% by weight vinylidene chloride, 0.5–5% by weight itaconic acid and 3–15% by weight acrylonitrile;
10–30 parts dibutyl phthalate;
5–15 parts dicyclohexyl phthalate;
0.5–10 parts paraffin wax, melting point 125°–170° F.;
0.1–10 parts maleic anhydride treated rosin glyceryl ester; and
0.1–1 part pulverized aluminum silicate clay.

8. A coating composition comprising by weight about 50–100 parts vinyl chloride homopolymer;

10–50 parts copolymer of 35–96.5% by weight vinylidene chloride, 0.5–25% by weight itaconic acid and 3–40% by weight of a mixture of acrylonitrile and methyl methacrylate;
10–30 parts dibutyl phthalate;
5–15 parts dicyclohexyl phthalate;
0.5–10 parts stearamide; and
0.1–1 part particulate antiblocking agent.

9. A hydrophilic organic polymeric article coated with about 1–10 grams per square meter of a coating composition comprising by weight about
50–100 parts vinyl chloride homopolymer;
10–50 parts copolymer of 35–96.5% by weight vinylidene chloride, 0.5–25% by weight of an acidic ethylenic compound and 3–40% by weight of at least one other polymerizable monoolefinic monomer;
10–30 parts of a first plasticizer having a melting point below about 40° C. and selected from the group consisting of dicyclohexyl phthalate, tricyclohexyl phosphate, triphenyl phosphate and tricyclohexyl citrate;
5–10 parts of a second plasticizer having a melting point above about 40° C., and selected from the group consisting of dibutyl phthalate, di(methylcyclohexyl) phthalate, butyl benzyl phthalate, diphenyl 2-ethylhexyl phosphate, triethyl citrate, tributyl citrate, acetyl tributyl citrate and acetyl trioctyl citrate;
0.5–10 parts wax; and
0.1–1 part particulate antiblocking agent.

10. An article as set forth in claim 9 wherein said hydrophilic organic polymeric article is a regenerated cellulose article.

11. An article as set forth in claim 10 wherein said regenerated cellulose article is a regenerated cellulose film.

12. An article as set forth in claim 11 wherein said vinyl chloride homopolymer has a specific viscosity of about 0.2–0.6 when measured at 30° C. at a concentration of 0.4% by weight in solution in nitrobenzene.

13. An article as set forth in claim 11 wherein said wax is a moistureproofing wax and said composition additionally contains about 0.1–10 parts by weight of a blending resin.

14. An article as set forth in claim 13 wherein said copolymer constitutes about 80–96.5% by weight of vinylidene chloride.

15. An article as set forth in claim 13 wherein said wax is a paraffin wax having a melting point within the range of about 125° to 170° F.

16. A regenerated cellulose film coated with about 1–10 grams per square meter of a coating composition comprising by weight about
50–100 parts vinyl chloride homopolymer;
10–50 parts copolymer of 80–96.5% by weight vinylidene chloride, 0.5–5% by weight itaconic acid and 3–15% by weight acrylonitrile;
10–30 parts dibutyl phthalate;
5–15 parts dicyclohexyl phthalate;
0.5–10 parts paraffin wax, melting point 125°–170° F.;
0.1–10 parts maleic anhydride treated rosin glyceryl ester; and
0.1–1 part pulverized aluminum silicate clay.

17. A regenerated cellulose film coated with about 1–10 grams per square meter of a coating composition comprising by weight about
50–100 parts vinyl chloride homopolymer;
10–50 parts copolymer of 35–96.5% by weight vinylidene chloride, 0.5–25% by weight itaconic acid and 3–40% by weight of a mixture of acrylonitrile and methyl methacrylate;
10–30 parts dibutyl phthalate;
5–15 parts dicyclohexyl phthalate;
0.5–10 parts stearamide; and
0.1–1 part particulate antiblocking agent.

References Cited by the Examiner
UNITED STATES PATENTS

| | | | |
|---|---|---|---|
| 2,570,478 | 10/1951 | Pitzl | 260—78.5 |
| 2,585,222 | 2/1952 | Bruins | 260—27 |
| 2,910,385 | 10/1959 | Berry | 117—145 |
| 2,955,958 | 10/1960 | Brown | 117—113 |
| 3,014,004 | 12/1961 | Meier | 260—898 |
| 3,036,977 | 5/1962 | Koch | 260—27 |
| 3,057,756 | 10/1962 | Cornwell | 260—27 |
| 3,192,066 | 6/1965 | Raes | 117—145 |

FOREIGN PATENTS

| | | |
|---|---|---|
| 12,733 | 5/1933 | Australia. |

OTHER REFERENCES

Mellan, Industrial Plasticizers, 1962, pages 155, 156, 181, 182 relied on.

Warth, The Chemistry and Technology of Waxes, 1947, pages 283, 284 relied on.

Penn, PVC Technology, 1962, pages 74, 342, 343 relied on.

LEON J. BERCOVITZ, *Primary Examiner.*

F. McKELVEY, *Assistant Examiner.*